United States Patent
Buerger et al.

(10) Patent No.: US 12,434,643 B2
(45) Date of Patent: Oct. 7, 2025

(54) AUTOMOTIVE ELECTRIC AUXILIARY DEVICE

(71) Applicant: PIERBURG PUMP TECHNOLOGY GMBH, Neuss (DE)

(72) Inventors: Frank Buerger, Neuss (DE); Martin Mueller, Neuss (DE)

(73) Assignee: PIERBURG PUMP TECHNOLOGY GMBH, Neuss (DE)

( * ) Notice: Subject to any disclaimer, the term of this patent is extended or adjusted under 35 U.S.C. 154(b) by 0 days.

(21) Appl. No.: 18/684,695

(22) PCT Filed: Aug. 20, 2021

(86) PCT No.: PCT/EP2021/073175
§ 371 (c)(1),
(2) Date: Feb. 19, 2024

(87) PCT Pub. No.: WO2023/020704
PCT Pub. Date: Feb. 23, 2023

(65) Prior Publication Data
US 2024/0425003 A1     Dec. 26, 2024

(51) Int. Cl.
*B60R 16/03* (2006.01)
(52) U.S. Cl.
CPC .................. *B60R 16/03* (2013.01)
(58) Field of Classification Search
CPC ...................................... B60R 16/03
USPC ....................................... 307/10.1
See application file for complete search history.

(56) References Cited

U.S. PATENT DOCUMENTS

| | | | |
|---|---|---|---|
| 2010/0329363 | A1 | 12/2010 | Ng et al. |
| 2016/0101748 | A1 | 4/2016 | Ambrosio et al. |
| 2016/0146876 | A1* | 5/2016 | Park .................. G01R 31/52 |
| | | | 701/29.2 |
| 2020/0050166 | A1 | 2/2020 | Hinderer |
| 2021/0119549 | A1* | 4/2021 | Wang ............... H02M 3/33538 |
| 2023/0010616 | A1 | 1/2023 | Gschwantner et al. |

FOREIGN PATENT DOCUMENTS

| | | |
|---|---|---|
| DE | 10 2010 030 452 | 5/2011 |
| DE | 10 2013 209 712 A1 | 11/2014 |
| DE | 10 2019 219 032 A1 | 6/2021 |
| EP | 3 403 885 A1 | 11/2018 |

* cited by examiner

*Primary Examiner* — Michael R. Fin
(74) *Attorney, Agent, or Firm* — Norman B. Thot

(57) ABSTRACT

An automotive electric auxiliary device includes an electronic high-voltage motor which is driven by an electronic high voltage power circuit, an electronic low-voltage control circuit which is galvanically isolated from the electronic high-voltage power circuit, and a wake-up unit which wakes-up the electronic high-voltage power circuit. The wake-up unit includes a low-voltage wake-up input port which receives a single wake-up flank, and an inductive coupling element which inductively transmits the single wake-up flank to a releasable latch unit. The releasable latch unit transforms the single wake-up flank to a set constant high-voltage activity signal level for indicating a non-sleeping mode to the electronic high-voltage power circuit.

7 Claims, 1 Drawing Sheet

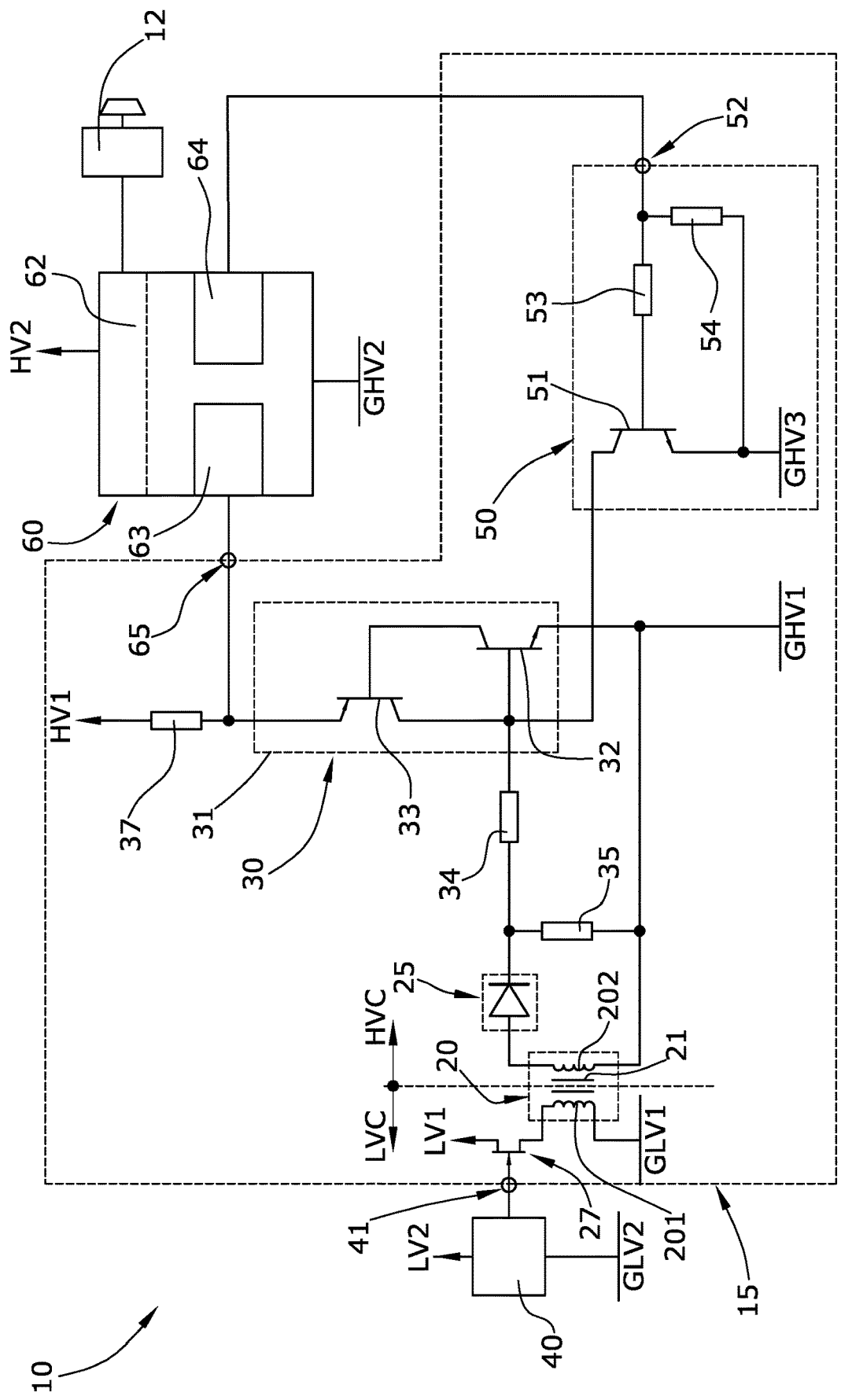

AUTOMOTIVE ELECTRIC AUXILIARY DEVICE

CROSS REFERENCE TO PRIOR APPLICATIONS

This application is a U.S. National Phase application under 35 U.S.C. § 371 of International Application No. PCT/EP2021/073175, filed on Aug. 20, 2021. The International Application was published in English on Feb. 23, 2023 as WO 2023/020704 A1 under PCT Article 21 (2).

FIELD

The present invention is directed to an automotive electric auxiliary device, in particular to an automotive electric fluid pump.

BACKGROUND

Due to the increasing need of electric power within a vehicle electrical system comprising electric auxiliary devices with more than 200 W and up to several kW, a high-voltage power supply system is added to the conventional low-voltage vehicle on-board power supply system which typically supplies the vehicle control systems and low-voltage consumers. Such high-voltage power supply systems are used to supply the more powerful automotive electric auxiliary devices to increase electric efficiency.

Such a high-voltage power supply system allows, for example, the replacement of conventional mechanically driven automotive pumps which are mechanically driven, for example, via an internal combustion engine, by fully electric pumps having an equal performance.

According to the requirements of the Original Equipment Manufacturers (OEMs), the data communication between the vehicle control units and the automotive electric auxiliary devices must be provided by the low-voltage system. The high-voltage power supply system must therefore be galvanically isolated from the low-voltage power supply system. The control units of the vehicle which are connected to the low-voltage control circuit must, however, be able to transmit control signals to the auxiliary device which are connected to the high-voltage power circuit. Various coupling elements as optocouplers, relays or inductive couplers are therefore known which allow a signal transmission between two electronic circuits which are galvanically isolated from each other.

EP 3 403 885 A1 describes such a vehicle electrical system, wherein the signal transmission can, for example, be realized by an optocoupler.

An optocoupler is very sensitive to high temperatures. An optocoupler is therefore not suitable for an application within thermally loaded auxiliary devices, in particular for auxiliary devices which are located close to an internal combustion engine.

The electrification of fluid pumps in vehicles allows for a demand-oriented control where the fluid pump can be shut down if a fluid supply is not required. In order to reduce power consumption, the control system of the fluid pump is switched to a sleeping mode if the pump is not required. In order to wake up the control system of the fluid pump, a wake-up signal is transmitted from the vehicle control system, which is a part of the low-voltage circuit, via the galvanic coupling element to the control system of the fluid pump, which is a part of the high-voltage circuit.

DE 10 2010 030 452 A1 describes a vehicle electrical system where a wake-up signal is transmitted from a first electronic circuit to a second electronic circuit via a galvanic coupling element for waking up an electric component from a sleeping mode, for example, via a wake-up pulse signal cascade.

The second electronic circuit comprises several cost-intensive electronic components, such as a Schmitt-trigger and a SR-flip-flop, to transform this wake-up pulse signal cascade into a constant signal.

SUMMARY

An aspect of the present invention is to provide a simple, cost-effective, and reliable automotive electric auxiliary device.

In an embodiment, the present invention provides an automotive electric auxiliary device which includes an electronic high-voltage motor which is configured to be driven by an electronic high voltage power circuit, an electronic low-voltage control circuit which is galvanically isolated from the electronic high-voltage power circuit, and a wake-up unit which is configured to wake-up the electronic high-voltage power circuit. The wake-up unit comprises a low-voltage wake-up input port which is configured to receive a single wake-up flank, and an inductive coupling element which is configured to inductively transmit the single wake-up flank to a releasable latch unit. The releasable latch unit transforms the single wake-up flank to a set constant high-voltage activity signal level for indicating a non-sleeping mode to the electronic high-voltage power circuit.

BRIEF DESCRIPTION OF THE DRAWING

The present invention is described in greater detail below on the basis of embodiments and of the drawing in which:

The FIGURE shows a schematic circuit diagram of the control system of an automotive electric auxiliary device according to the present invention.

DETAILED DESCRIPTION

An automotive electric auxiliary device according to the present invention comprises an electronic high-voltage motor which is driven by an electronic high voltage power circuit. The electronic high-voltage motor can, for example, be an electronic drive motor of an automotive electric fluid pump which can be supplied by a high-voltage vehicle on-board power supply system, wherein the voltage can, for example, be a maximum of 60 V. The automotive electric fluid pump can, for example, be driven by a 48V on-board power supply system.

The automotive electric auxiliary device further comprises an electronic low-voltage control circuit which can be connected to a low-voltage vehicle on-board power supply system, wherein the maximum voltage can, for example, be a 12V on-board power supply system. The electronic low voltage control circuit is galvanically isolated from the electronic high voltage power circuit. The automotive electric auxiliary device comprises a wake-up unit for waking up the electronic high-voltage power circuit. The wake-up unit comprises a low-voltage wake-up input port which receives a single wake-up flank which can be a positive or a negative flank, but is, for example, a temporally relatively short pulse-type signal.

The wake-up unit further comprises an inductive coupling element for inductively transmitting the single wake-up flank to a releasable latch unit. The releasable latch unit is arranged within the electronic high-voltage power circuit and transforms the single wake-up flank to a set constant high-voltage activity signal level so that the releasable latch unit generates a permanent activity signal in the electronic high-voltage power circuit. If a short pulse-type flank is applied to and is received by the input of the releasable latch unit, the releasable latch unit is transferred into a self-latching state and generates a constant signal at the output of the releasable latch unit so that a non-sleeping mode is indicated to the electronic high-voltage power circuit, which puts an auxiliary device control unit controlling the auxiliary device into an operating mode. The releasable latch unit can, for example, be a bistable multivibrator, a flipflop, or a thyristor.

The auxiliary device control unit accordingly stays in a low power consumption mode if the auxiliary device is not used but can be woken up by a single low-voltage wake-up flank. Due to the short wake-up flank, a low power consumption of the low-voltage control circuit is provided because no permanent control signal is needed within the low-voltage control circuit which must be permanently transmitted to the high-voltage power circuit to operate the auxiliary device. If the auxiliary device is not in operating mode, the low-voltage control circuit as well as the high voltage power circuit are both in a very low power consumption mode so that the automotive electric auxiliary device is extremely energy efficient.

In an embodiment of the present invention, the electronic high-voltage power circuit can, for example, comprise a reset device for resetting the releasable latch unit. The reset device turns off the releasable latch unit to generate a constant non-activity signal level if the auxiliary device should not be or must not be activated. This constant non-activity signal level indicates a sleeping mode to the electronic high-voltage power circuit so that the sleeping mode is also indicated to the auxiliary device control unit and the auxiliary device is shut down. Compared to the state-of-the-art, the sleeping mode is not initiated by a signal which must be transmitted from the low-voltage control circuit via the inductive coupling element to the high-voltage control circuit, but is initiated by the auxiliary device control unit directly so that the auxiliary device can, for example, be shut down even if the signal transmission within the low voltage control circuit is interrupted.

The releasable latch unit can, for example, be a thyristor. A thyristor can, for example, be a separate electronic component or can alternatively be a very simple electronic circuit with discrete semi-conductor components, for example, an electronic circuit comprising two interconnected transistors. With such a thyristor, the single low-voltage wake-up flank can be transformed to the constant activity signal level without any additional electronic components. The thyristor additionally amplifies the input signal so that a relatively low forward breakover voltage is required to fire up the thyristor, wherein the voltage for firing up the thyristor is substantially the voltage which is required for switching a transistor. The thyristor is therefore already fired up by a wake-up flank of 0.7 V.

In an embodiment of the present invention, the reset device can, for example, comprise a reset transistor which resets the releasable latch unit to generate the constant high-voltage non-activity signal level. The reset transistor is a very cost-efficient electronic component which is connected to the reset port of the releasable latch unit. If a voltage of at least 0.7 V is applied to the reset transistor, the reset transistor switches to turn off the releasable latch unit so that the self-latching condition of the releasable latch unit is interrupted and the high-voltage power circuit returns into the sleeping mode.

In an embodiment of the present invention, the reset transistor can, for example, reset the thyristor. The combination of a reset transistor and a thyristor results in an extremely cost-efficient and energy-efficient power circuit.

The inductive coupling element can, for example, be defined by two inductive coils. Both inductive coils are wound with an identical number of windings around a common iron core. Such an inductive coupling element is relatively tolerant against relatively high temperatures of up to 160° C. so that it is in particular suitable for the application within an automotive electric auxiliary device, for example, an electric coolant or lubricant pump which is arranged close to an internal combustion engine, and which therefore reaches operating temperatures of up to 150° C. A common-mode choke can, for example, be used as such an inductive coupling element. A common-mode choke is a low-cost standard part and is in particular suitable for a high-speed transmission of very short flank signals at high frequencies.

In an embodiment of the present invention, an anti-interference diode can, for example, be provided within the electronic high-voltage power circuit. The anti-interference diode is arranged between the inductive coupling element and the releasable latch unit. The anti-interference diode reduces interferences such as interference signals from external components, for example, radio signals which could be misinterpreted as a wake-up flank, so that upcoming interferences do not cause the high-voltage power circuit to wake up.

The electronic low-voltage control circuit can, for example, be connected to a low voltage supply sensor. This low-voltage supply sensor detects a vehicle sided control voltage supply which signalizes that the auxiliary device can be started. If the low-voltage supply sensor detects a vehicle sided control voltage supply, a low-voltage wake-up flank is sent to the low-voltage control circuit via the wake-up input port and from there, via the inductive coupling element, to the high-voltage power circuit, so that the auxiliary device is started.

An embodiment of the present invention is described below with reference to the enclosed drawing.

The FIGURE shows an electrical control circuit of an automotive electric coolant pump 10 for cooling an internal combustion engine of a motor vehicle. The automotive electric coolant pump 10 comprises an electronic low-voltage control circuit LVC and an electronic high-voltage power circuit HVC which is galvanically isolated from the electronic low-voltage control circuit LVC. The automotive electric coolant pump 10 further comprises a wake-up unit 15 comprising a common-mode choke 21 as an inductive coupling element 20 which inductively transmits signals from the electronic low-voltage control circuit LVC to the electronic high-voltage power circuit HVC.

The common-mode choke 21 comprises a first low-voltage inductive coil 201 and a second high-voltage inductive coil 202, wherein both inductive coils 201, 202 are provided with a common iron core. The first low-voltage inductive coil 201 is arranged within the electronic low-voltage control circuit LVC and is electrically connected to a first low-voltage ground potential GLV1. The first low-voltage inductive coil 201 is also connected to a first channel sided connector of a wake-up transistor 27 which can, for example, be a field effect transistor (FET). The second channel-sided connector of the wake-up transistor 27 is connected to a first low-voltage potential LV1. The gate of the wake-up transistor 27 is connected to a low-voltage supply sensor 40 via a wake-up input port 41 which receives a short wake-up flank from the low-voltage supply sensor 40 if the low-voltage supply sensor 40 detects a proper voltage supply.

The low-voltage supply sensor 40 is electrically connected to a second low-voltage potential LV2 and a second low-voltage ground potential GLV2, wherein the first low-voltage potential LV1 and the second low-voltage potential LV2 can be one single identical low-voltage potential, and wherein the first low-voltage ground potential GLV1 and the second low-voltage ground potential GLV2 can be one single identical low-voltage ground potential.

The wake-up flank temporarily switches the wake-up transistor 27 so that a voltage is temporarily applied to the first low-voltage inductive coil 201. The wake-up flank is thereby transmitted to the first low-voltage inductive coil 201. The wake-up flank temporarily generates a magnetic field which induces a voltage within the second high-voltage inductive coil 202. The wake-up flank is thereby transmitted from the first low-voltage inductive coil 201 to the second high-voltage inductive coil 202.

The second high-voltage inductive coil 202 is electrically connected to an anode of an anti-interference diode 25 which allows the wake-up flank to pass. The second high-voltage inductive coil 202 is further connected to a first high-voltage ground potential GHV1. The cathode of the anti-interference diode 25 is electrically connected to a base resistor 34 which is electrically connected to the base of a bipolar npn-transistor 32. An additional resistance bridge with a resistor 35 is provided which directly connects the cathode of the anti-interference diode 25 to the first high-voltage ground potential GHV1. The collector of the bipolar npn-transistor 32 is electrically connected to the base of a pnp-transistor 33. The bipolar npn transistor 32 and the pnp-transistor thereby define a thyristor 31, wherein the base of the bipolar npn-transistor 32 defines the gate of the thyristor 31, the emitter of the pnp-transistor 33 defines the anode of the thyristor 31, and the emitter of the bipolar npn-transistor 32 defines the cathode of the thyristor 31. The anode of the thyristor 31 is connected to a first high-voltage potential HV1 via a resistor 37. An electrical line branches off between the anode of the thyristor 31 and the resistor 37 which is electrically connected to a pump control unit 60 via an indicator output port 65, the pump control unit 60 being electrically connected to a second high-voltage potential HV2 and to a second high-voltage ground potential GHV2.

In its basic state, the thyristor 31 is in a non-conducting state so that the non-activity signal level is 48 V at the indicator output port 65. If the wake-up flank is applied to the gate of the thyristor 31, the forward breakover voltage of the thyristor 31 is exceeded and the thyristor 31 fires up so that the thyristor 31 changes to a conducting state. This conducting state is self-latching so that the single wake-up flank is transformed to a set constant high-voltage activity signal level of about 2 V. The electronic high-voltage power circuit HVC and the pump control unit 60 wake up from the sleeping mode as a result so that the pump power unit 62 of the pump control unit 60 activates the electronic high-voltage motor 12 of the automotive electric coolant pump 10. The automotive electric coolant pump thereby changes to the operating mode. Because of the self-latching state of the thyristor 31, the automotive electric coolant pump 10 remains in the operating mode without requiring a permanent control signal from the electronic low-voltage control circuit LVC.

The automotive electric coolant pump 10 comprises a reset device 50 which comprises a reset transistor 51 for turning off the thyristor 31. The collector of the reset transistor 51 is connected to the gate of the thyristor 31, whereas the emitter of the reset transistor 51 is connected to a third high-voltage ground potential GHV3. The base of the reset transistor 51 is electrically connected to a reset control module 64 within the pump control unit 60 via a base transistor 53 and a reset input port 52. The reset device 50 comprises a resistance bridge with a second resistor 54 for adapting the voltage. The first high-voltage potential HV1 and the second high-voltage potential HV2 can be one single identical high-voltage potential, and the first high-voltage ground potential GHV1, the second high-voltage ground potential GHV2, and the third high-voltage ground potential GHV3 can also be one single identical high-voltage ground potential.

For returning the electronic high-voltage power circuit HVC to the sleeping mode, the reset control module 64 applies a voltage to the base of the reset transistor 51 so that the reset transistor 51 switches, whereupon the self-latching state of the thyristor 31 is ended and the thyristor 31 returns to the non-conducting state. The pump control unit 60 thereby no longer receives an activity signal but receives a non-activity signal level via the indicator output port 65 so that both the pump control unit 60 and the electronic high-voltage power circuit HVC return to the sleeping mode. The electronic high-voltage motor 12 of the automotive electric coolant pump 10 stops as a result so that the automotive electric coolant pump 10 returns to a non-operating mode.

The present invention is not limited to embodiments described herein; reference should be had to the appended claims.

LIST OF REFERENCE CHARACTERS

10 Automotive electric coolant pump
12 Electronic high-voltage motor
15 Wake-up unit
20 Inductive coupling element
21 Common-mode choke
25 Anti-interference diode
27 Wake-up transistor
30 Releasable latch unit
31 Thyristor
32 Bipolar npn-transistor
33 pnp-transistor
34 Base resistor
35 Resistor
37 Resistor
40 Low-voltage supply sensor
41 Wake-up input port
50 Reset device
51 Reset transistor
52 Reset input port
53 Base transistor
54 Second resistor
60 Pump control unit
62 Pump power unit
64 Reset control module
65 Indicator output port
201 First low-voltage inductive coil
202 Second high-voltage inductive coil LV1 First low-voltage potential
LV2 Second low-voltage potential
LVC Electronic low-voltage control circuit
GLV1 First low-voltage ground potential
GLV2 Second low-voltage ground potential
GHV1 First high-voltage ground potential
GHV2 Second high-voltage ground potential
GHV3 Third high-voltage ground potential
HV1 First high-voltage potential
HV2 Second high-voltage potential
HVC Electronic high-voltage power circuit

What is claimed is:

1. An automotive electric auxiliary device comprising:
an electronic high-voltage motor which is configured to be driven by an electronic high voltage power circuit;
an electronic low-voltage control circuit which is galvanically isolated from the electronic high-voltage power circuit; and
a wake-up unit which is configured to wake-up the electronic high-voltage power circuit, the wake-up unit comprising,
a low-voltage wake-up input port which is configured to receive a single wake-up flank, and
an inductive coupling element which is configured to inductively transmit the single wake-up flank to a releasable latch unit which transforms the single wake-up flank to a set constant high-voltage activity signal level for indicating a non-sleeping mode to the electronic high-voltage power circuit, the releasable latch unit being a thyristor.

2. The automotive electric auxiliary device as recited in claim 1, wherein the electronic high-voltage power circuit comprises a reset device for resetting the releasable latch unit so as to generate a constant non-activity signal level for indicating a sleeping mode to the electronic high-voltage power circuit.

3. The automotive electric auxiliary device as recited in claim 2, wherein the reset device comprises a reset transistor which resets the releasable latch unit so as to generate the set constant high-voltage non-activity signal level.

4. The automotive electric auxiliary device as recited in claim 3, wherein the reset transistor is configured to turn off the thyristor.

5. The automotive electric auxiliary device as recited in claim 1, wherein,
the inductive coupling element is defined by a low-voltage inductive coil and a high-voltage inductive coil which have a common iron core, and
the low-voltage inductive coil and the high-voltage inductive coil have an identical number of windings.

6. The automotive electric auxiliary device as recited in claim 1, further comprising:
an anti-interference diode which is arranged within the electronic high-voltage power circuit between the inductive coupling element and the releasable latch unit, the anti-interference diode being configured to reduce interference signals.

7. The automotive electric auxiliary device as recited in claim 1, further comprising:
a low-voltage supply sensor which is configured to detect a vehicle-sided control voltage supply,
wherein,
the electronic low-voltage control circuit is connected to the low-voltage supply sensor.

* * * * *